United States Patent
Ramanathan

(10) Patent No.: US 6,577,613 B1
(45) Date of Patent: Jun. 10, 2003

(54) METHOD AND APPARATUS FOR ASYNCHRONOUS RESERVATION-ORIENTED MULTIPLE ACCESS FOR WIRELESS NETWORKS

(75) Inventor: Subramanian Ramanathan, Belmont, MA (US)

(73) Assignee: Verizon Corporate Services Group Inc., Irving, TX (US)

( * ) Notice: Subject to any disclaimer, the term of this patent is extended or adjusted under 35 U.S.C. 154(b) by 0 days.

(21) Appl. No.: 09/261,302

(22) Filed: Mar. 2, 1999

(51) Int. Cl.⁷ ................................. H04Q 7/20
(52) U.S. Cl. ................... 370/337; 370/348; 370/468
(58) Field of Search ............................. 370/336, 337, 370/345, 347, 348, 468

(56) References Cited

U.S. PATENT DOCUMENTS

| | | |
|---|---|---|
| 4,471,469 A | 9/1984 | Boyers |
| 4,939,726 A | 7/1990 | Flammer et al. |
| 5,115,433 A | 5/1992 | Baran et al. |
| 5,371,734 A | 12/1994 | Fischer |
| 5,488,608 A | 1/1996 | Flammer, III |
| 5,570,084 A | 10/1996 | Ritter et al. |
| 5,640,395 A | 6/1997 | Hamalainen et al. |
| 5,844,900 A | 12/1998 | Hong et al. |
| 6,216,006 B1 * | 4/2001 | Scholefield et al. ........ 455/422 |
| 6,252,854 B1 * | 6/2001 | Hortensius et al. ......... 370/252 |

OTHER PUBLICATIONS

Tobagi, F., "Multiaccess Protocols in Packet Communication Systems," IEEE Transactions on Communications, vol. COM–28, No. 4, Apr. 1980, pp. 468–488.
Karn, P., "MACA—A New Channel Access Method for Packet Radio," pp. 1–5, undated.
Bharghavan, V., "MACAW: A Media Access Protocol for Wireless LAN's," pp. 221–225, 1994.

* cited by examiner

*Primary Examiner*—Melvin Marcelo
(74) *Attorney, Agent, or Firm*—Leonard Charles Suchyta; James K. Weixel

(57) ABSTRACT

This disclosure describes systems and methods for transmitting data over transmission bandwidth in a communication channel over a wireless network through asynchronous, reservation-oriented, multiple access to support real-time multimedia. The access to a transmission bandwidth in a communications channel is guaranteed (or reserved) from a terminal to a server by establishing a reserved bandwidth for a transmission in an on-demand, as-desired manner. A terminal reserves bandwidth with a server by corresponding with the server to reserve a finite bandwidth for transmissions of a data packet. A server recognizes the request for a finite bandwidth and approves the request, if capacity permits. Once a request has been approved, the systems and methods consist with this disclosure provide for reserved access to transmission bandwidth in a communications channel to support real-time network applications, including transactions involving wireless local area networks, cellular networks, and ad hoc networks.

106 Claims, 11 Drawing Sheets

METHOD AND APPARATUS FOR ASYNCHRONOUS RESERVATION-ORIENTED MULTIPLE ACCESS FOR WIRELESS NETWORKS

BACKGROUND OF THE INVENTION

A. Field of the Invention

The present invention relates to a method and apparatus for reserving access to bandwidth in a communications channel in a network. More particularly, the invention relates to methods and apparatus for reserving access to bandwidth in a communications channel in a wireless network using asynchronous transactions.

B. Description of the Related Art

As greater demands are placed on network technology, network applications will soon necessitate the reservation of bandwidth for seamless transmissions over a communications channel. Any type of network application that requires large amounts of bandwidth will be a candidate for the reservation of bandwidth. Of course, the most likely type of network applications that will require reserved bandwidth are multimedia applications. Examples of multimedia applications include packet voice and video conferencing. Yet, any network application that requires real-time transactions may require reserved bandwidth.

To provide for a reservation of bandwidth for multimedia and other bandwidth-dependent network applications, some methodology for reserving access to bandwidth on a communications channel will be required, where the reservation may be changed during the operation phase. This capability to accept changes during the operation phase is known as "on-demand, as-desired" allocation. Without this capability, the processing of a reservation of access during high bandwidth/low delay communications would be inhibited by other traffic, such as a large file transfer. In particular, for wireless local area networks, cellular networks, and ad hoc networks, the need for reserved access to bandwidth in a communications channel in an on-demand, as-desired manner will be most significant.

Traditional mechanisms for providing access to a communications channel have tended to reside in the framework of fixed or demand assignments using time division multiple access (TDMA). Some of the more common TDMA-based schemes for result access include priority-oriented demand assignment (PODA) and split-channel reservation multiple access (SRMA), which use complex, synchronous techniques. However, the TDMA-based schemes do not allow for the reservation of access to bandwidth over a communications channel in an asynchronous manner.

Another traditional mechanism is code division multiple access (CDMA), which uses a digital spread-spectrum modulation technique. However, because CDMA-based schemes do not readily provide for changing the amount of code allocated, which is needed for reserved access.

Still another traditional mechanism is frequency division multiple access (FDMA), which provides for the allocation of a frequency band to a user. However, like CDMA-based schemes FDMA-based schemes also do not allow for on-demand, as-desired allocation.

For the reasons noted above, CDMA-based schemes and FDMA-based schemes are not suitable for reserved access. Further, there are also problems with the TDMA-based schemes. Yet, because TDMA-based schemes are one of the most common mechanisms for providing access to a communications channel, it should be noted that TDMA-based schemes are also undesirable for reserved access based on several distinct disadvantages and shortcomings.

First, TDMA-based schemes are inadequate for bursty network traffic because the late arrival of a data packet results in the loss of the allocated time slot, a situation very common in bursty network traffic. Accordingly, this situation results from the inability to guarantee or reserve access.

Second, the TDMA-based schemes are also inadequate due to the inefficient allocation of resources. To contend for the possibility of a system failure, a TDMA-based scheme frequently makes excessive resources available in order to avoid failures from bursty network traffic. This failure contingency increases complexity, cost, and overhead for systems using TDMA-based schemes. Furthermore, one of the primary reasons that the TDMA-schemes are so inefficient is that the synchronization between nodes requires substantial additional time.

Third, the TDMA-based schemes are particularly inadequate because they are currently not compatible with the IEEE 802.11 standard. The IEEE 802.11 standard is the most common standard for wireless local area networks (wireless LANs), as established by the Institute of Electrical and Electronic Engineers (IEEE). The IEEE 802.11 standard for wireless LANs specifies an "over the air" interface between a wireless client and a base station, as well as among wireless clients. First conceived in 1990, the IEEE 802.11 standard has undergone six drafts, and the final draft was approved on Jun. 26, 1997. Now that IEEE 802.11 has become finalized, the incompatibility of the TDMA-based schemes with this standard will continue to become ever more significant.

Fourth, the TDMA-based schemes are also particularly inadequate because they are difficult to implement with ad hoc networks. An ad hoc network has no base station, and this peculiarity adds to the difficulty of using TDMA-schemes with these networks. This is because TDMA-based schemes require synchronization, and without a base station, synchronization is extremely difficult. This is one of the most significant shortcomings of the TDMA-schemes when used with ad hoc networks.

For the foregoing reasons, the current systems and methodologies reflect an unsatisfactory development of systems and methods for providing access to a communications channel in a network. Accordingly, a need exists for a scheme to provide for the actual reservation of access to bandwidth in a communications channel in a network in an on-demand, as-desired manner. In addition, a need also exists for the reservation of access to bandwidth in a communications channel by asynchronous methodologies.

SUMMARY OF THE INVENTION

Methods and apparatus consistent with the present invention overcome the shortcomings of the conventional systems by providing guaranteed access to bandwidth in a communications channel in a network.

In accordance with the purposes of the invention, as embodied and broadly described herein, one aspect of the invention includes a method consistent with the present invention of reserving access to a transmission bandwidth in a communications channel at a terminal in a network. This method comprises transmitting to a server a reservation request to send signal, indicating a request for reservation of transmission bandwidth in a communications channel in the network, receiving a first clear to send signal from the server, transmitting to the server a modified request to send signal, indicating a request for admission to transmit data over reserved bandwidth of a communications channel in the network, receiving a second clear to send signal, and transmitting a data packet to the server.

In another aspect, the invention includes a method of reserving access to a transmission bandwidth in a communications channel at a server in a network. This method comprises receiving from a terminal a reservation request to send signal, representing a request for reservation of transmission bandwidth in a communications channel in the network, transmitting a first clear to send signal to the terminal, receiving from the terminal a modified request to send signal, representing a request for admission to transmit data over reserved bandwidth of a communications channel in the network, transmitting a second clear to send signal, and receiving a data packet from the terminal.

In yet another aspect, the invention includes a method of reserving access to a transmission bandwidth in a communications channel in a network. The method comprises transmitting from a terminal to a server a reservation request to send signal, indicating a request for reservation of transmission bandwidth in a communications channel in the network, receiving at the server the reservation request to send signal, representing the request for reservation of transmission bandwidth in a communications channel in the network, transmitting a first clear to send signal from the server to the terminal, receiving the first clear to send signal at the terminal, transmitting from the terminal to the server a modified request to send signal, indicating a request for admission to transmit data over reserved bandwidth of a communications channel in the network, receiving at the server the modified request to send signal, representing the request for admission to transmit data over reserved bandwidth of a communications channel in the network, transmitting a second clear to send signal from the server to the terminal, receiving the second clear to send signal at the terminal, transmitting a data packet from the terminal to the server, and receiving the data packet at the server.

Additional aspects of the invention are disclosed and defined by the appended claims. It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, are incorporated in and constitute a part of this specification, illustrate preferred embodiments of the invention, and, together with the description, serve to explain the principles of the invention.

In the drawings.

DETAILED DESCRIPTION

A. Introduction

An embodiment of the invention as disclosed herein provides guaranteed access to bandwidth in a communications channel in a wireless network using an asynchronous methodology in an on-demand, as-desired manner. Accordingly, the embodiment avoids the inefficiencies and shortcomings of the present systems and methodologies, which primarily use TDMA-based schemes and rely on time synchronization and/or code or frequency partitioning. The asynchronous methodology used by the disclosed embodiment is based on the multiple access collision avoidance (MACA) protocol, which is the basis for the IEEE 802.11 standard for wireless networks.

In a traditional implementation of a wireless network using the asynchronous MACA protocol, before a station sends data, the sending station sends a "request to send" (RTS) signal to a receiving station. The receiving station then sends a "clear to send" (CTS) signal to the sending station, and at that point, the sending station begins sending data. If a second station in the wireless network also wishes to send data and sends an RTS, if there is a pending RTS from a first station, the second station waits for the former transmission to occur before attempting further communication. This delay avoids data collisions in the wireless network. Yet, using the conventional systems and methodologies, the existing MACA protocol does not provide for the reservation of access to a transmission bandwidth in a communications channel. However, the disclosed embodiments consistent with the principles of the present invention implement this capability using the MACA protocol.

B. System

Figure 1:
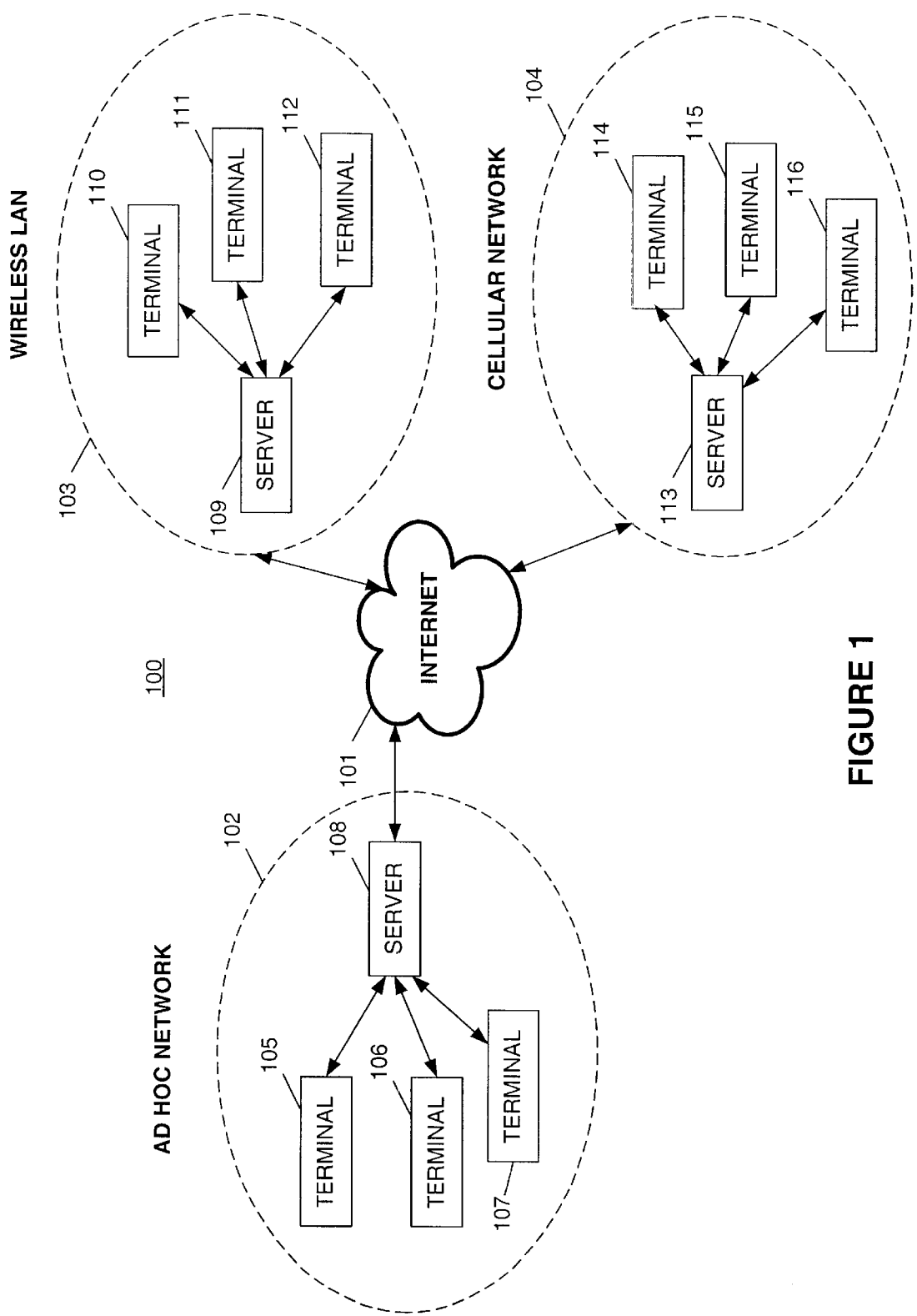
FIG. 1 is a diagram of an exemplary wireless network for implementing an embodiment consistent with the present invention.

FIG. 1 is a diagram of an exemplary wireless network for implementing an embodiment consistent with the present invention. Network 100 includes an ad hoc network 102, a wireless local area network (LAN) 103, and a cellular network 104. Each of the networks 102–104 is connected to each other through a network, such as, for example, Internet 101. In addition, each network includes a server and a plurality of associated terminals. Ad hoc network 102 includes server 108 and associated terminals 105, 106, and 107. Wireless LAN 103 includes a server 109 and associated terminals 110, 111, and 112. Typically, in a wireless LAN, such as wireless LAN 103, server 109 is a base station and associated terminals 110, 111, and 112 are client terminals. Cellular network 104 includes a server 113 and associated terminals 114, 115, and 116. Typically, in a cellular network, such as cellular network 104, server 113 is a base station and associated terminals 114, 115, and 116 are client terminals.

Each of the networks 102–104 may implement processing, described below, for reserving access to bandwidth in communications channel within the networks. Significantly, these three networks are merely examples of networks for implementing reservation of access to bandwidth in a communications channel, and other or different networks may be used.

Figure 2:
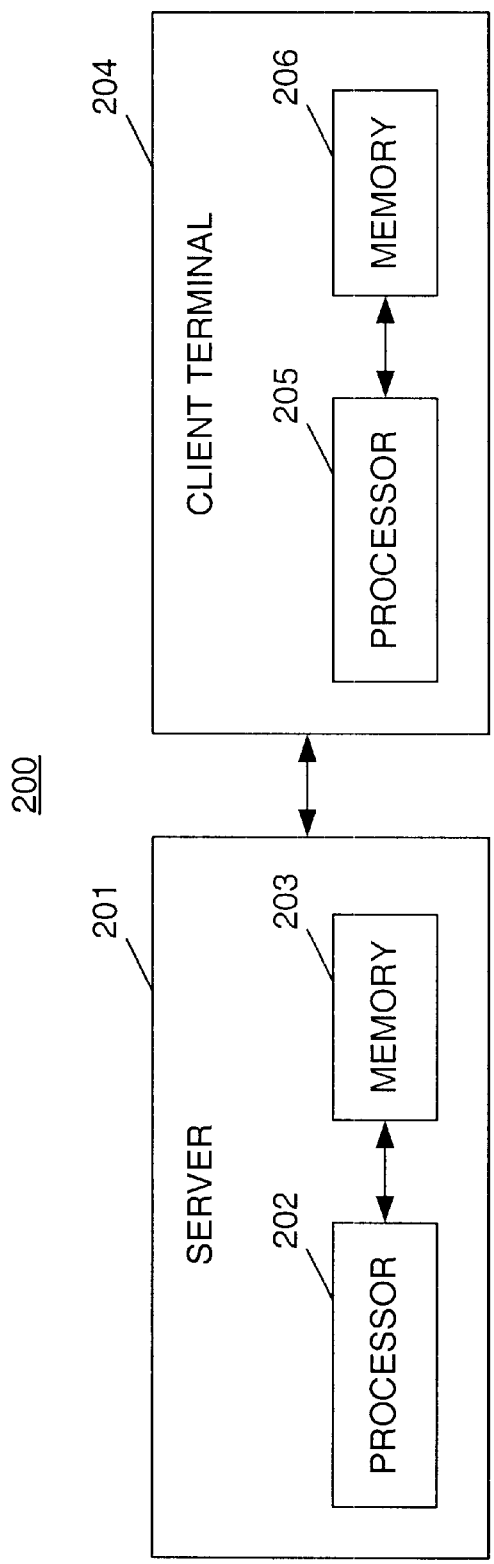
FIG. 2 is a diagram of a server and a client terminal for implementing an embodiment consistent with the present invention.

FIG. 2 is a diagram of an exemplary server and an exemplary associated client terminal. In network 200, a server 201 is associated with a client terminal 204. Server 201 may correspond with servers 108, 109, or 113. Client terminal 204 may correspond with any of the terminals and networks 102–104. As shown, server 201 includes a processor 202 connected with an associated memory 203. Client terminal 204 includes a processor 205 connected with an associated memory 206. Memories 203 and 206 may store network applications for controlling processors 202 and 205 in order to implement a method for reserving access to a communications channel in the corresponding network.

Figure 3A:
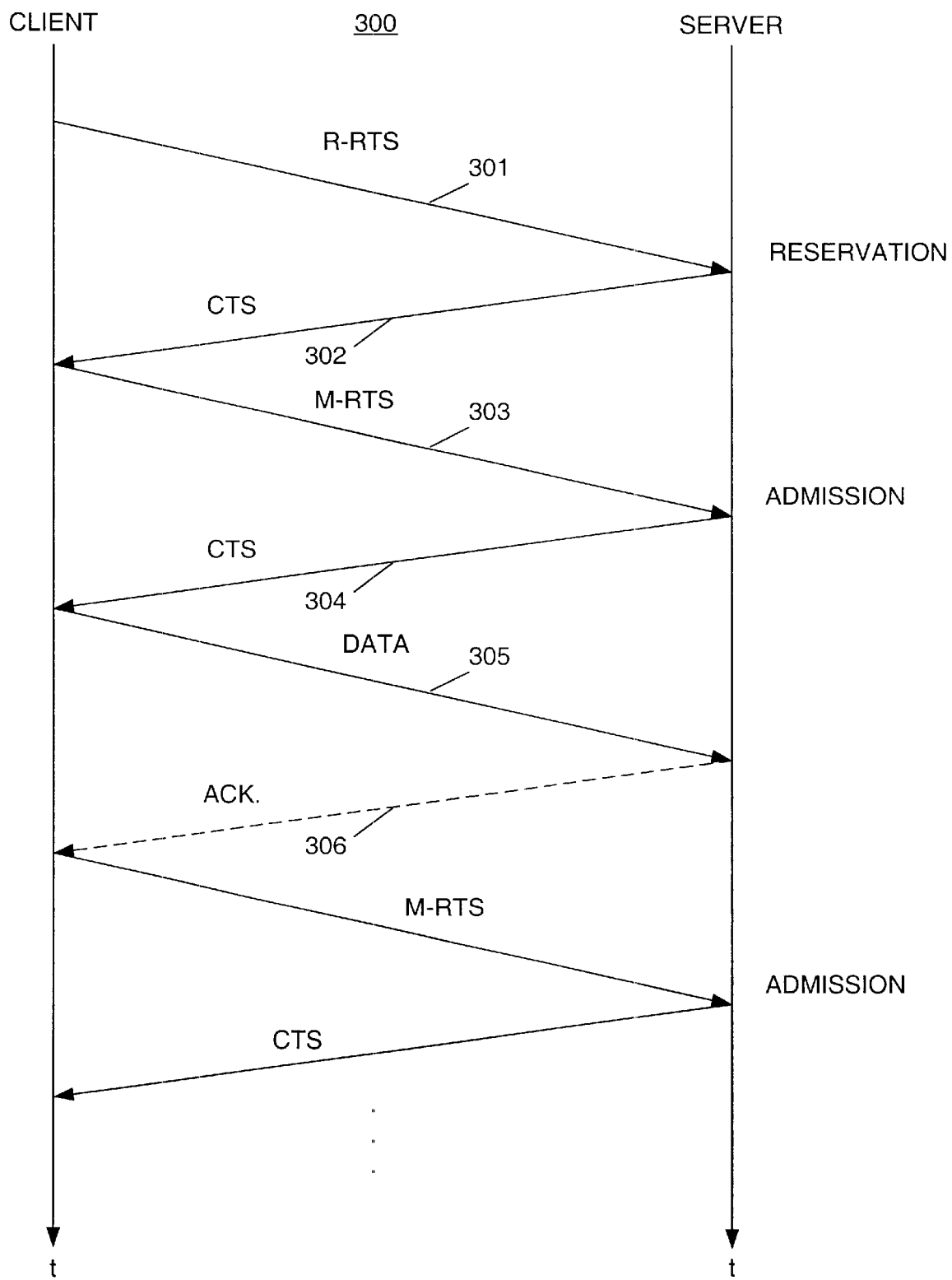
FIG. 3A is a timing diagram illustrating communication for reserving access to bandwidth in a communications channel in a wireless network.

FIG. 3A is an exemplary timing diagram illustrating reservation of access to bandwidth in a communications channel in one of the networks 102–104 and representing a communications session 300. In session 300, an example is given of a client requesting reservation of access to bandwidth in a communications channel, consistent with an embodiment of the invention. In the example, a client transmits a reservation-RTS (R-RTS) signal 301 to a server. R-RTS signal 301 is a special kind of RTS and is used to request reservation of access to bandwidth in a communications channel. In a traditional implementation, only an RTS signal is available, which cannot reserve access to bandwidth in a communications channel. However, systems consistent with the invention are compatible with the traditional implementation, although they also include and provide for an R-RTS, such as, for example, R-RTS signal 301.

Upon receipt of R-RTS signal 301, the server determines whether the channel capacity request can be accommodated by the "reservation functionality," as described below. If the server accepts the reservation pursuant to the reservation functionality, the server transmits CTS signal 302, confirming reservation of the requested access. The client subsequently transmits a modified-RTS (M-RTS) signal 303 to the server. M-RTS signal 303 is another special kind of RTS and is used to request admission for transmission of data. Again, although providing for this M-RTS signal 303, systems consistent with the invention are still compatible with the traditional implementation, which includes only the RTS signal. Upon receipt of M-RTS signal 303, the server determines whether to admit the reserved transmission by the "admission functionality," as described below. M-RTS signal 303 contains a channel reservation id, so that the server can identify whether a particular M-RTS corresponds to an earlier R-RTS. If the server can accommodate the transmission of the data identified by M-RTS signal 303, the server replies with CTS signal 304, after which the client transmits data 305. The server may optionally transmit an acknowledgment (ACK) signal 306, upon receipt of data 305. The client and server subsequently transmit respective M-RTS and CTS signals for the remaining data transmissions in session 300. Notably, upon receipt of a regular RTS, the server also determines whether to admit the nonreserved transmission by the "admission functionality." The "reservation functionality" and "admission functionality" are described below.

Figure 3B:
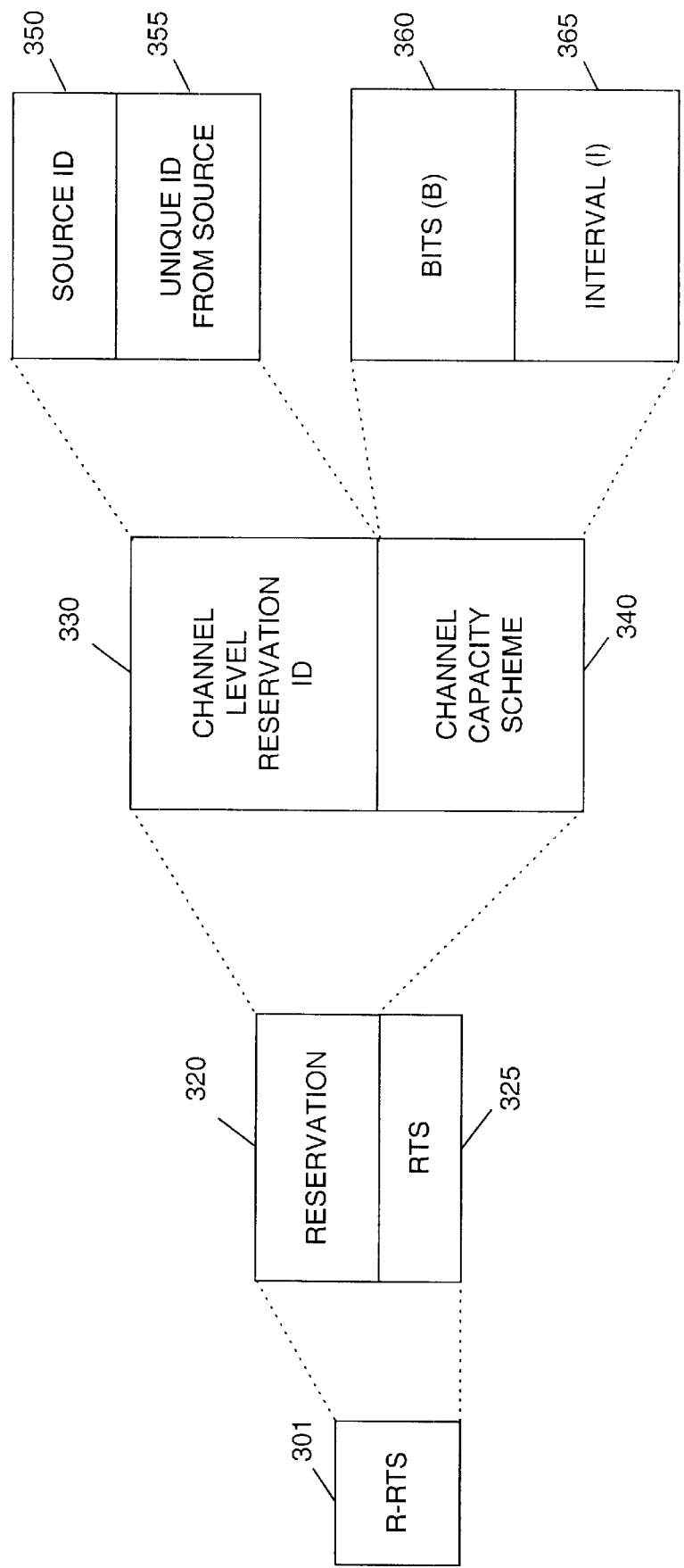
FIG. 3B is a diagram of a reservation request to send signal, consistent with one embodiment of the invention.

FIG. 3B is a diagram of an exemplary R-RTS signal 301. As shown in FIG. 3B, R-RTS signal 301 comprises a reservation 320 and a typical RTS signal 325. In one implementation, reservation 320 contains a channel level reservation id 330 and a channel capacity scheme 340. Channel level reservation id 330 is uniquely identified by source id 350 and unique id from source 355. Source id 350 is simply an identification of the source of the R-RTS. Unique id from source 355 is generated by the client using a counter, so that each unique id from source 355 is different from all other instances of unique id from source 355. Channel capacity scheme 340 is identified by B, I, which represents bits 360 and interval 365. Channel capacity scheme 340 thus includes two parameters, B, the maximum number of bits that can be sent in a specified interval, and I, the specified interval in seconds. In this context, B,I is the traffic description method for establishing channel capacity known as a "moving window descriptor."

Figure 3C:
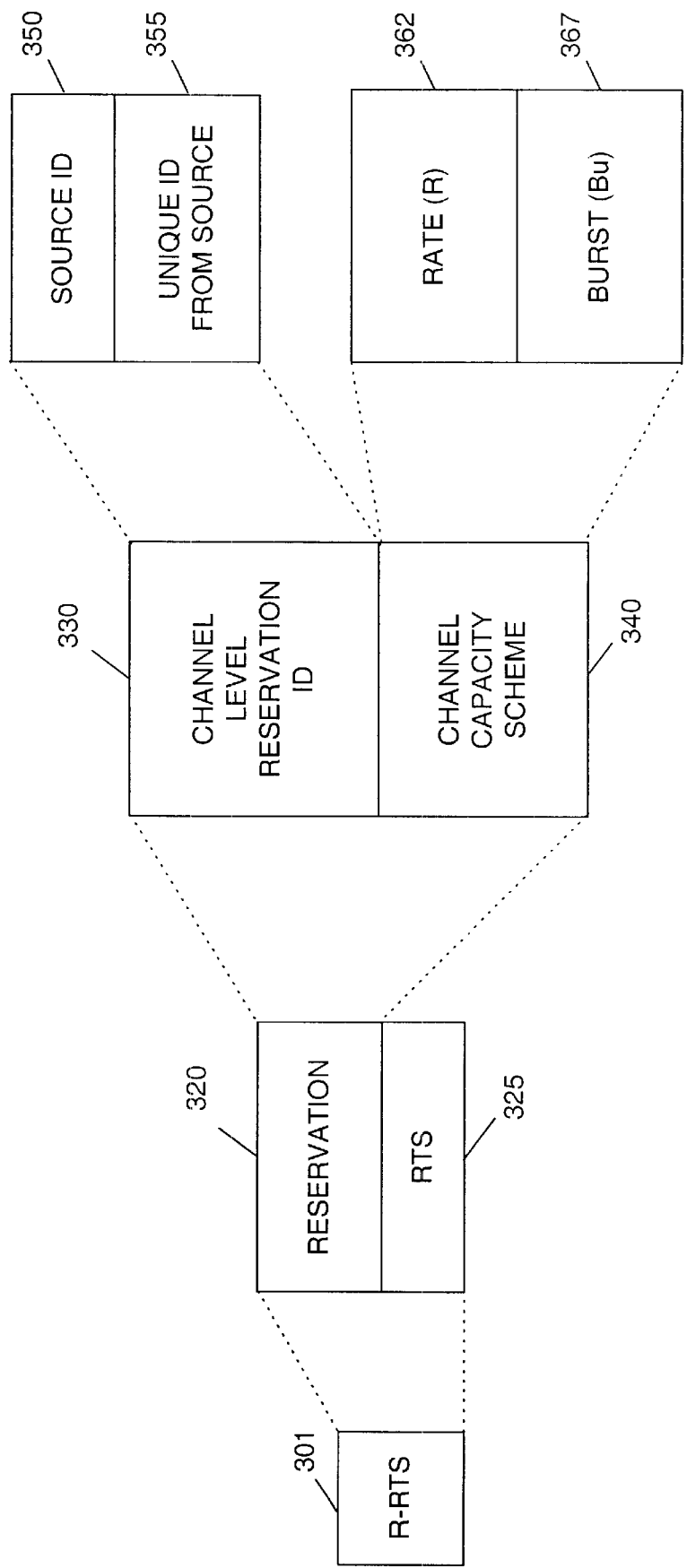
FIG. 3C is a diagram of a reservation request to send signal, consistent with another embodiment of the invention.

FIG. 3C is a diagram of another exemplary R-RTS signal 301. Similar to FIG. 3B, as shown in FIG. 3C, R-RTS signal 301 comprises a reservation 320 and a typical RTS signal 325. Also, reservation 320 contains a channel level reservation id 330 and a channel capacity 340, which is uniquely identified by source id 350 and unique id from source 355. In FIG. 3C, however, channel capacity scheme 340 is identified by R, Bu, not B, I. R, Bu represents rate 362 and burst 367. Channel capacity scheme 340 thus includes two parameters, R, the average rate of the source, and Bu, the maximum allowable traffic (or "burst"). In this context, R, Bu is the traffic description method for establishing channel capacity known as "linear bounded arrival process" (LBAP), also known as a "leaky bucket descriptor." Thus, the maximum number of bits that can be sent in a specified interval of time, T, does not exceed the computation, $R*T+Bu$.

Figure 3D:
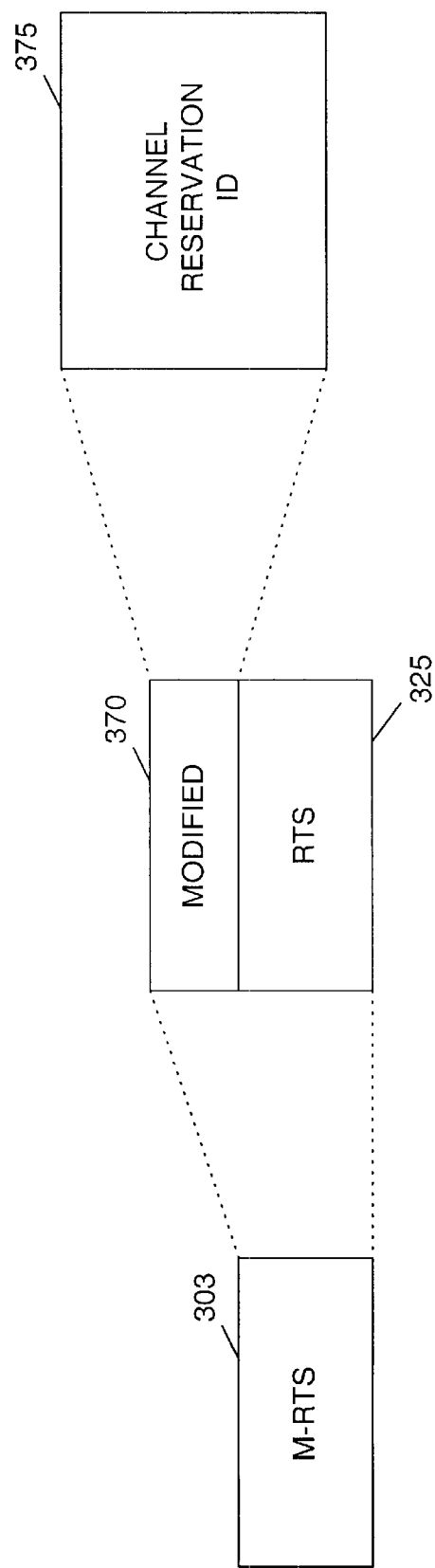
FIG. 3D is a diagram of a modified request to send signal, consistent with one embodiment of the invention.

FIG. 3D is a diagram of an exemplary M-RTS signal 303. As shown in FIG. 3D, M-RTS signal 303 comprises a modification 370 and a regular RTS signal 325. In one implementation, M-RTS signal 303 contains a channel reservation id 375. As stated above, channel reservation id 375 allows the server to identify whether a M-RTS signal 325 corresponds to an earlier R-RTS signal 301. In such an implementation, each M-RTS signal 325 for a particular R-RTS signal 301 contains this channel reservation id 375.

C. Process

Figure 4A:
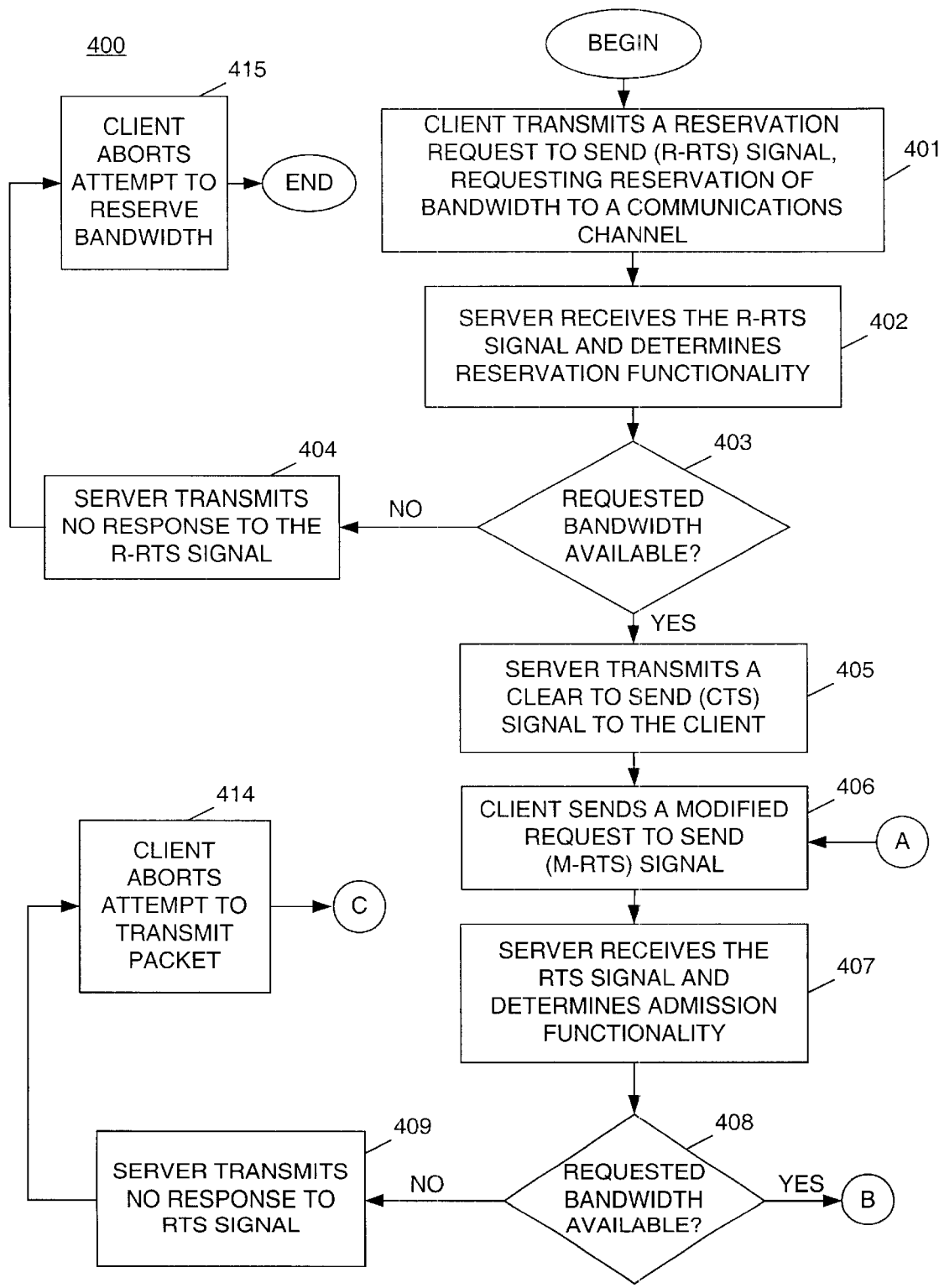
FIGS. 4A–4B are flow charts illustrating the reservation of access to a communications channel in a wireless network.
Figure 4B:
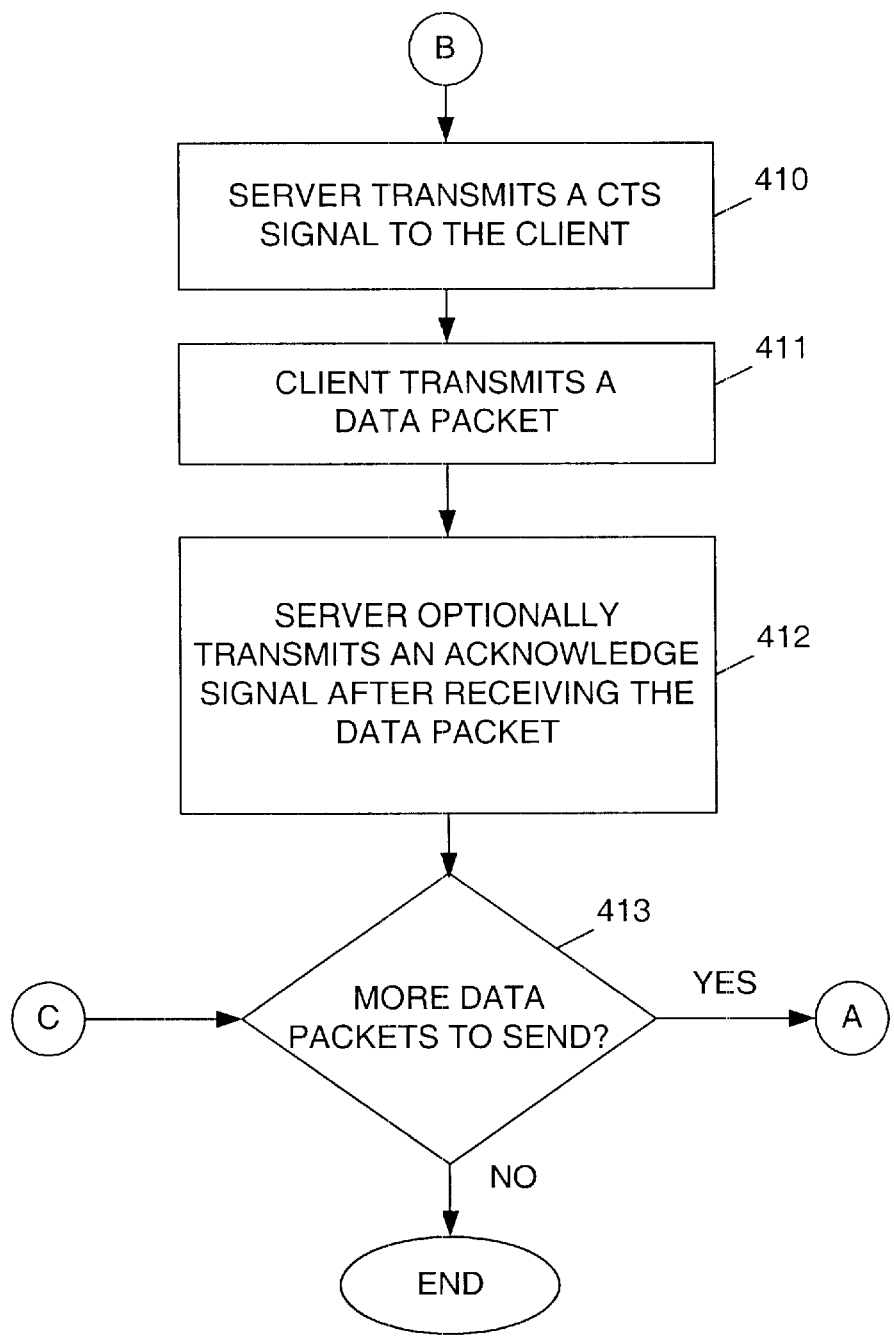

FIGS. 4A and 4B are a flow chart of an exemplary process 400 for reserving access to bandwidth in a communications channel in a network. Process 400 may be implemented by an application stored in memory 203 and 206 for controlling processors 202 and 205 for communication between server 201 and client terminal 204. In process 400, a client terminal transmits an R-RTS signal, requesting reservation of bandwidth in a communications channel (step 401). A server receives the R-RTS signal and determines reservation functionality (step 402). In the reservation functionality, which is described in detail below, the server determines whether the requested bandwidth is available (step 403) and, if so, transmits a CTS signal to the client terminal (step 405). If the requested bandwidth is not available, the server transmits no response to the client terminal (step 404). If the server transmits no response, then the R-RTS will time out, and the client terminal will abort the attempt to reserve bandwidth (step 415).

If the client terminal obtains a reservation from the server (i.e., if the client terminal receives a CTS signal), the client sends an M-RTS signal to the server to begin transmission of data on the reserved bandwidth (step 406). The server receives the M-RTS signal and determines admission functionality (step 407). In the admission functionality, which is described in detail below, the server determines whether the requested bandwidth is available at that time (step 408) and, if so, transmits a CTS signal to the client (step 410). If the requested bandwidth is not available, the server transmits no response to the client terminal (step 409). If the server transmits no response, then the M-RTS signal will time out, and the client terminal will abort the attempt to transmit the packet (step 414). If this occurs, it is then determined whether there are more data packets to be sent.

If the client terminal obtains permission to begin transmission of data (i.e., if the client terminal receives a CTS signal), the client terminal transmits a data packet to the server at the particular bandwidth (step 411). The server optionally transmits an acknowledge signal after receiving the data packet (step 412). Next, it is determined whether there are more data packets to be sent (step 413). If so, the client sends another M-RTS signal to the server and the process repeats. If not, the process terminates.

D. State Diagrams

Figure 5:
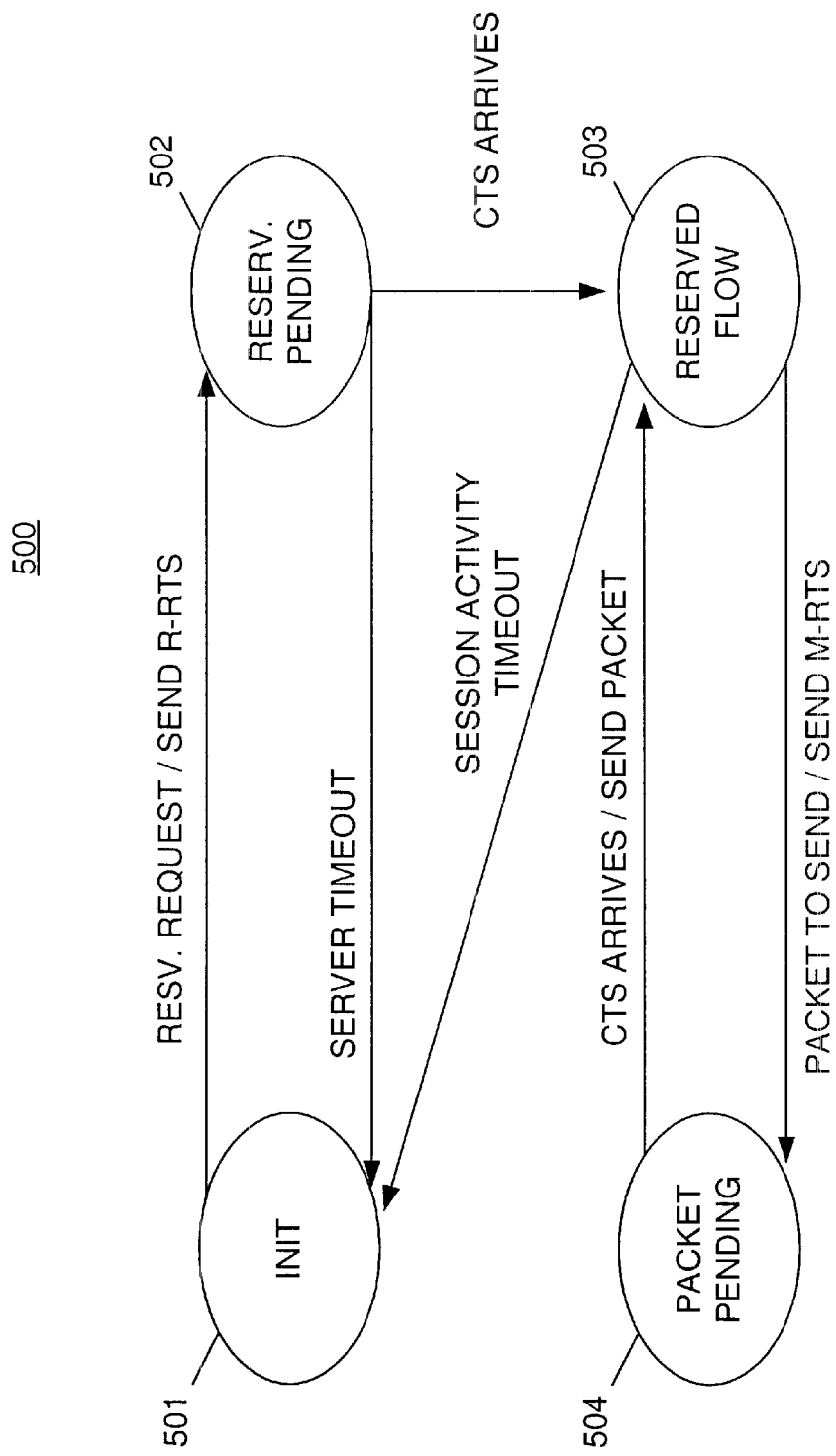
FIG. 5 is a state diagram illustrating how a client reserves access to bandwidth in a communications channel in a wireless network.

FIG. 5 is a state diagram 500 forclient terminal 204 illustrating the various states of a client terminal during the reservation and admission functionality. In one implementation, a client terminal has four states in the reservation and admission functionality: initialization state 501, reservation pending state 502, reserved flow state 503, and packet pending state 504. A client terminal changes from initialization state 501 to reservation pending state 502 in response to sending a reservation request or an R-RTS signal. The client changes from a reservation pending state 502 to a reserved flow state 503 in response to receiving a CTS signal and then changes to an initialization state 501 in response to a server timeout. The client terminal changes from a reserved flow state 503 to a packet pending state 504 in response to a ready to send (i.e., ready for admission) or a M-RTS signal, and changes to an initialization state 501 in response to a session activity timeout. The client terminal changes from packet pending state 504 to a reserved flow state 503 in response to receiving a CTS signal and the sending of a data packet.

Table 1 depicts exemplary pseudocode for implementing these client terminal functions.

TABLE 1

Client Terminal Reservation and Admission Functionality

```
Function send RTS(type)
begin
    if type = default
    then send RTS with unique id from source = 0
    if type = reserv
    then begin
        generate and save unique id from source
        send R-RTS with unique id from source
    end
    if type = admit
    then send M-RTS with channel reservation id
    if type = packet
    then send RTS
end.
```

As shown by the pseudocode in Table 1, there are two alternatives for a client terminal that desires to send a data packet: first, a client terminal may wish to transmit data without a reservation; and second, a client terminal may reserve bandwidth for a transmission. In the first alternative, if the client terminal does not want to reserve bandwidth for a transmission, then the client terminal simply transmits an RTS. This default RTS contains a default reservation id from source (e.g., 0). This default RTS indicates that the RTS is not an R-RTS. In the second alternative, if the client terminal does want to reserve bandwidth for a transmission, then the client terminal generates a unique id from source and transmits a request to send containing that id, that is, the client terminal transmits an R-RTS. Notably, as described above, the R-RTS also adheres to some channel capacity scheme. Upon receipt, the server then processes the R-RTS using the server reservation functionality. As shown by the pseudocode in Table 1, there is also an alternative RTS, or the M-RTS. Once the server has approved an R-RTS and assigned a channel reservation id, the client terminal transmits an M-RTS to the server, when the client terminal is ready to transmit data. The server processes the M-RTS using the server admission functionality. Finally, as also shown by the pseudocode in Table 1, there is also a packet RTS. The packet RTS simply indicates to the server that another data packet is ready for transmission.

Figure 6:
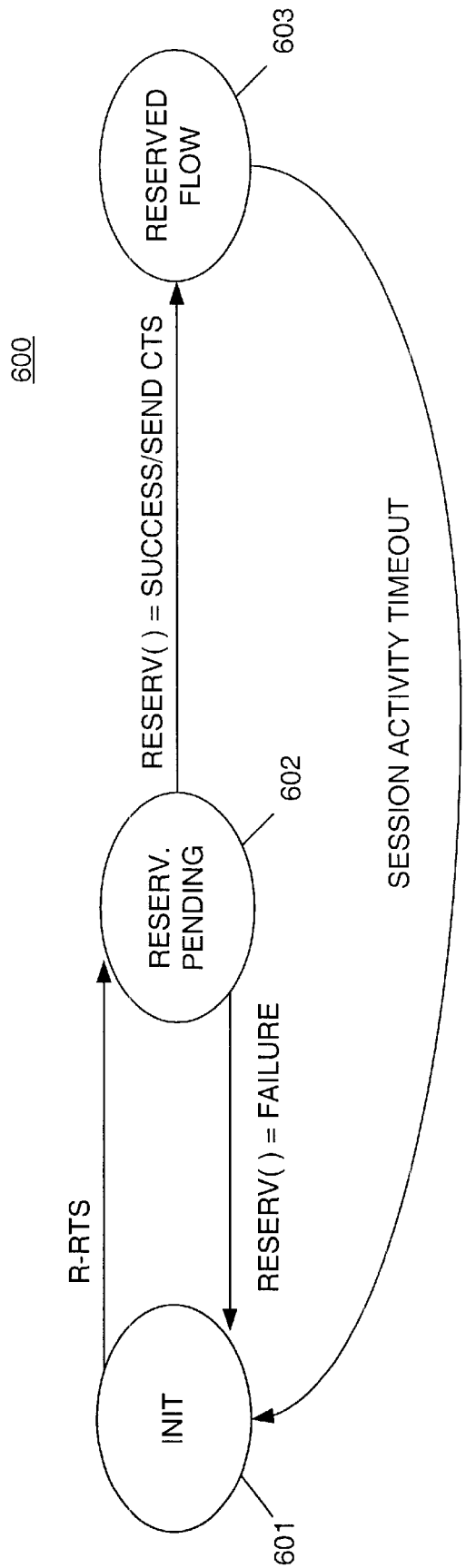
FIG. 6 is a state diagram illustrating how a server processes a reservation request for access to bandwidth in a communications channel in a wireless network.

FIG. 6 is a state diagram 600 for server 201 illustrating the various states of a server during the reservation functionality. In one implementation, a server has three states in the reservation functionality: initialization state 601, reservation pending state 602, and reserved flow state 603. The server changes from initialization state 601 to reservation pending state 602 in response to receiving an R-RTS signal. The server changes from a reservation pending state 602 to reserve flow state 603 in response to a successful reservation and the transmission of a corresponding CTS signal, and changes from reservation pending state 602 to initialization state 601 in response to the failure of a reservation. The server changes from reserve flow state 603 to initialization state 601 in response to a session activity timeout.

Table 2 depicts exemplary pseudocode for implementing these server reservation functions.

TABLE 2

Server Reservation Functionality

```
Function Reserv()
begin
    if requested capacity + used capacity <= total capacity
    then begin
        add a new element for this flow to the reservation list
        return SUCCESS
    end
    else
        return FAILURE
end.
```

As shown by the pseudocode in Table 2, in a preferred implementation, consider that a server maintains a total capacity TC, representing the total number ofbits that the server can receive in one second. In this implementation, one way of computing TC is to take the maximum transmission rate possible by the server and multiply it by an efficiency factor k, where 0<k<=1. The value of k is application and system dependent. In addition, in this implementation, further consider that the server maintains a reservation list containing information about all active reservations. As shown in FIGS. 3B and 3C, each instance of a reservation in this reservation list contains a source id, which identifies the source of the reservation a unique id from source, which provides for identification of each reservation, and a channel capacity scheme, which consists of at least two possible schemes (i.e., the moving window descriptor or the leaky bucket descriptor). The server thus maintains a used capacity UC, which is the sum of all reservations in the reservation list. The calculation of UC is based on the effective capacity EC, that is, the effective capacity of each reservation. The calculation of EC depends upon the channel capacity scheme. If using the moving window descriptor, EC=B/I, and if using the leaky bucket descriptor, EC=R. Of course, these are just two possible implementations of a channel capacity scheme, and other implementations are possible, which use the same system. One skilled in the art would fully comprehend other viable alternatives using the disclosed system.

In an implementation of the pseudocode from Table 2, upon activation or reset of the server, the used capacity, UC, is empty and the reservation list is empty. When a new reservation request arrives in the form of an R-RTS, the server checks whether the requested capacity, RC, in the R-RTS plus the used capacity, UC, exceeds the total capacity, TC. Like the calculation of UC, as described above, the calculation of RC also depends on the channel capacity scheme. Thus, once the calculation is made, if the RC does not exceed TC, then the R-RTS is added to the reservation list and a CTS is sent to the client terminal. The CTS indicates that the reservation has been accepted by the server. In a preferred implementation, the CTS also contains a channel reservation id.

Figure 7:
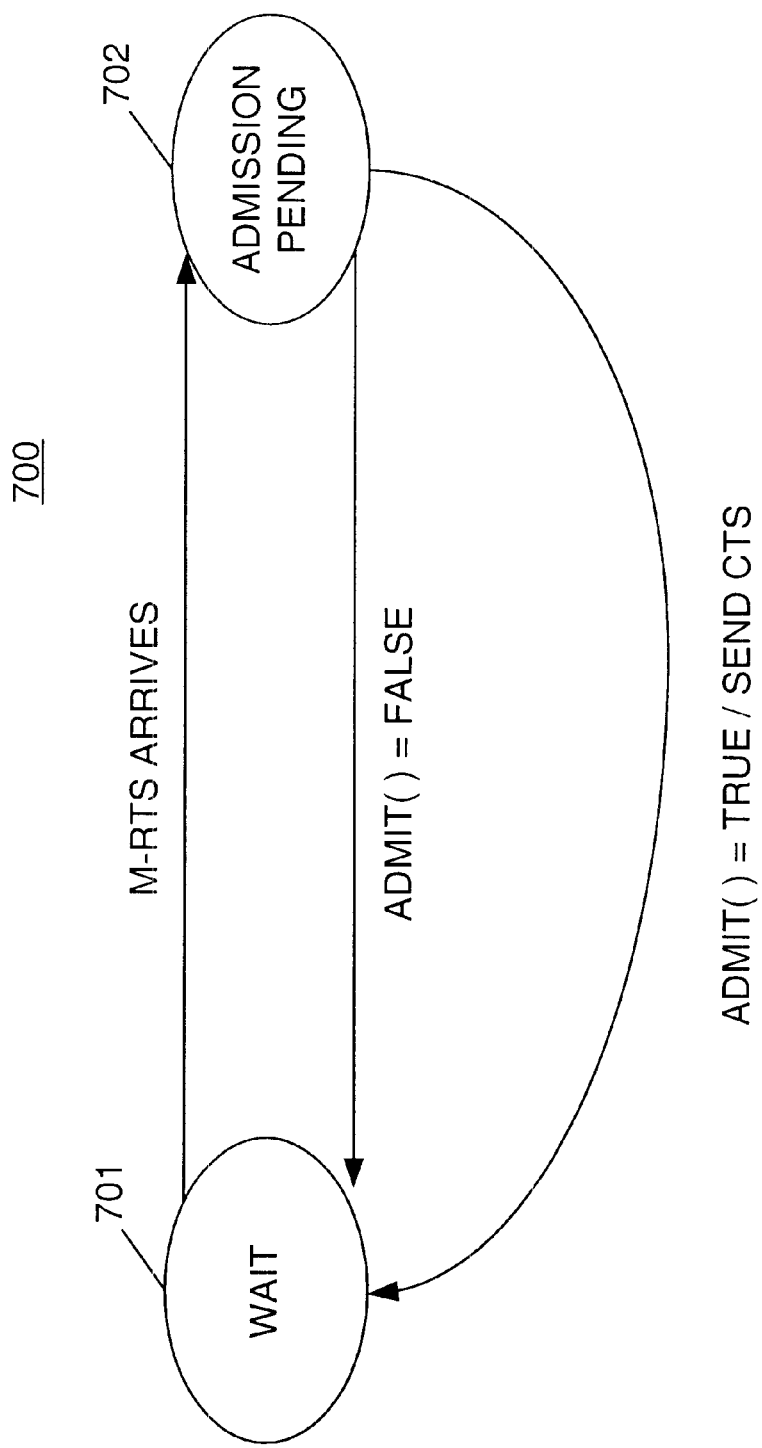
FIG. 7 is a state diagram illustrating how a server processes an admission request for reserving access to bandwidth in a communications channel in a wireless network.

FIG. 7 is a state diagram 700 for server 201 illustrating the various states for the server during the admission functionality. In one implementation, a server has two states in the admission functionality: wait state 701 and admission pending state 702. The server changes from wait state 701 to admission pending state 702 in response to receiving an M-RTS signal. The server changes from an admission pending state 702 to wait state 701 in response to the result of the admission functionality. If the admission functionality approves the M-RTS, then the server transmits a CTS signal. If the admission functionality rejects the M-RTS, then the server rejects the M-RTS.

Table 3 depicts exemplary pseudocode for implementing these server admission functions.

TABLE 3

Server Admission Functionality let R, Bu = channel descriptors (rate, burst)
let AC = available capacity
let LUT = last updated time
let LAC = last available capacity
let ET = elapsed time
let R, Bu = rate, burst
let AC = Bu
let LUT = time when R-RTS was received
let LAC = Bu
Function Admit()
begin
    ET = current Time − LUT
    AC = minimum (Bu, (LAC + ET * R))
    LAC = AC
    LUT = current Time
    if AC exceeds number of bits for the M-RTS
    then begin
        LAC = LAC − number of bits for the M-RTS
        return TRUE (i.e., send CTS)
    end
    else return FALSE (i.e., do not send CTS)
end.

As indicated by FIG. 7, when a client terminal is ready to transmit a data packet following a successful reservation, it sends an M-RTS signal to the server. As described above, such a "modified" RTS (or M-RTS) has a field containing the channel reservation id, which indicates that the data packet is associated with a reservation. In one implementation, if the packet does not have a channel reservation id, there is a special value for this field (e.g., 0). Upon review of the channel reservation id in the M-RTS, the server then decides whether or not to send a CTS in response to the M-RTS. This is the server admission functionality. Specifically, as explained above, the server maintains total capacity, TC, and used capacity, UC, where UC indicates the active reservations. Thus, upon receipt of an M-RTS, the server executes the admission functionality and responds with a CTS only if the admission functionality allows.

As shown by the pseudocode in Table 3, upon arrival of an M-RTS, the server performs the server admission function. Initially, the server computes the maximum number of bits that may be sent, or the available capacity, AC. The method of computing AC depends upon the channel capacity scheme implemented by the server admission functionality. In Table 3, an example of a leaky bucket descriptor is used, where R, Bu are the channel descriptors. Thus, with this method of computing AC, the server computes the burst, Bu, and the sum of the last available capacity, LAC, and the additional capacity that became available during the elapsed time, which is the product of the elapsed time, ET, and the rate, R. Thus, with the AC, the server can then determine admission for the M-RTS. If the number of bits requested to be sent in the M-RTS is no more than the maximum number of bits that are permitted to be sent (i.e., AC), then the server admits the M-RTS and sends a CTS to the client. Conversely, if the number of bits requested to be sent in the M-RTS is more than AC, then the server denies admission to the M-RTS and sends no CTS.

As described above, the method of computing AC depends upon the channel capacity scheme implemented by the server admission functionality. Although not depicted in Table 3, another channel capacity scheme that may be used by the server admission functionality is the moving window descriptor. This implementation would resemble the pseudocode in Table 3, except that Bu=o and R would be assigned the value of B/I. One skilled in the art would fully comprehend this and other viable alternative implementations using the disclosed system.

Conclusion

Systems consistent with the present invention overcome the disadvantages of the traditional mechanisms by providing reserved access to bandwidth in a communications channel in a network in an asynchronous on-demand, as-desired manner. By providing for the reservation of bandwidth, such systems fully support bursty traffic. In addition, they further provide these benefits without the complexity and overhead of TDMA-based schemes. Also, provided capacity is available, the systems continue to support traffic that has no reserved access. As a result, the systems allow for available bit rate (ABR) service, something not available in most TDMA-based schemes. Further, because the systems only slightly amend the MACA protocol (i.e., at least by the addition of the R-RTS and M-RTS signals), only minor changes are required to the MACA protocol for compatability. As a result, even with these modifications, the systems consistent with the present invention remain backwards compatible with the IEEE 802.11 standard. Finally, such systems function seamlessly with ad hoc networks.

As described above, therefore, it will be apparent to those skilled in the art that various modifications and variations can be made in the methods and apparatus of the present invention without departing from the spirit and scope of the invention. Thus, it is intended that the present invention cover the modifications and variations of this invention, provided they come within the scope of the appended claims and their equivalents. In this context, equivalents mean each and every implementation for carrying out the functions recited in the claims, even if not explicitly described herein.

What is claimed is:

1. A method of reserving access to a transmission bandwidth in a communications channel at a terminal in a network, comprising the steps of:
   transmitting to a server a reservation request to send signal, indicating a request for reservation of transmission bandwidth in a communications channel in the network;
   receiving a first clear to send signal from the server;
   transmitting to the server a modified request to send signal, indicating a request for admission to transmit data over reserved bandwidth of a communications channel in the network;
   receiving a second clear to send signal; and
   transmitting a data packet to the server.

2. The method of claim 1, further comprising:
   receiving an acknowledgment signal from the server following the transmission of the data packet to the server.

3. The method of claim 1, wherein the reservation request to send signal includes a channel level reservation id and an indication of required channel capacity.

4. The method of claim 3, wherein the channel level reservation id includes a source id and a unique id from source.

5. The method of claim 3, wherein the indication of required channel capacity includes B/I, representing the number of bits (B) to send in an interval (I).

6. The method of claim 3, wherein the indication of required channel capacity includes using a linear bounded arrival process.

7. The method of claim 1, wherein the first clear to send signal contains a channel reservation id.

8. The method of claim 1, wherein the modified request to send signal includes a channel reservation id.

9. The method of claim 1, wherein the third transmitting step occurs using a bandwidth confirmed by the first clear to send signal.

10. A system for reserving access to a transmission bandwidth in a communications channel at a terminal in a network, comprising:
    a reservation transmitting component configured to transmit to a server a reservation request to send signal, indicating a request for reservation of transmission bandwidth in a communications channel in the network;
    a first receiving component configured to receive a first clear to send signal from the server;
    an admission transmitting component configured to transmit to the server a modified request to send signal, indicating a request for admission to transmit data over reserved bandwidth of a communications channel in the network;
    a second receiving component configured to receive a second clear to send signal; and
    a transmitting component configured to transmit a data packet to the server.

11. The system of claim 10, further comprising:
    a third receiving component configured to receive an acknowledgment signal from the server following the transmission of the data packet to the server.

12. The system of claim 10, wherein the reservation request to send signal includes a channel level reservation id and an indication of required channel capacity.

13. The system of claim 12, wherein the channel level reservation id includes a source id and a unique id from source.

14. The system of claim 12, wherein the indication of required channel capacity includes B/I, representing the number of bits (B) to send in an interval (I).

15. The system of claim 12, wherein the indication of required channel capacity includes using a linear bounded arrival process.

16. The system of claim 10, wherein the first clear to send signal contains a channel reservation id.

17. The system of claim 10, wherein the modified request to send signal includes a channel reservation id.

18. The system of claim 10, wherein the transmitting component occurs using a bandwidth confirmed by the first clear to send signal.

19. A computer usable medium having computer readable code embodied therein for reserving access to a transmission bandwidth in a communications channel at a terminal in a network, the computer usable medium comprising:
    a reservation transmitting module configured to transmit to a server a reservation request to send signal, indicating a request for reservation of transmission bandwidth in a communications channel in the network;
    a first receiving module configured to receive a first clear to send signal from the server;
    an admission transmitting module configured to transmit to the server a modified request to send signal, indicating a request for admission to transmit data over reserved bandwidth of a communications channel in the network;
    a second receiving module configured to receive a second clear to send signal; and
    a transmitting module configured to transmit a data packet to the server.

20. A method of reserving access to a transmission bandwidth in a communications channel at a server in a network, comprising the steps of:
    receiving from a terminal a reservation request to send signal, representing a request for reservation of transmission bandwidth in a communications channel in the network;
    transmitting a first clear to send signal to the terminal;
    receiving from the terminal a modified request to send signal, representing a request for admission to transmit data over reserved bandwidth of a communications channel in the network;
    transmitting a second clear to send signal; and
    receiving a data packet from the terminal.

21. The method of claim 20, further comprising:
    transmitting an acknowledgment signal to the terminal following the receipt of the data packet at the server.

22. The method of claim 20, wherein the reservation request to send signal includes a channel level reservation id and an indication of required channel capacity.

23. The method of claim 22, wherein the channel level reservation id includes a source id and a unique id from source.

24. The method of claim 22, wherein the indication of required channel capacity includes B/I, representing the number of bits (B) to send in an interval (I).

25. The method of claim 22, wherein the indication of required channel capacity includes using a linear bounded arrival process.

26. The method of claim 20, wherein the first clear to send signal contains a channel reservation id.

27. The method of claim 20, wherein the modified request to send signal includes a channel reservation id.

28. The method of claim 20, wherein the third receiving step occurs using a bandwidth confirmed by the first clear to send signal.

29. A system for reserving access to a transmission bandwidth in a communications channel at a server in a network, comprising:
- a reservation receiving component configured to receive from a terminal a reservation request to send signal, representing a request for reservation of transmission bandwidth in a communications channel in the network;
- a first transmitting component configured to transmit a first clear to send signal to the terminal;
- an admission receiving component configured to receive from the terminal a modified request to send signal, representing a request for admission to transmit data over reserved bandwidth of a communications channel in the network;
- a second transmitting component configured to transmit a second clear to send signal; and
- a receiving component configured to receive a data packet from the terminal.

30. The system of claim 29, further comprising:
- a third transmitting component configured to transmit an acknowledgment signal to the terminal following the receipt of the data packet at the server.

31. The system of claim 29, wherein the reservation request to send signal includes a channel level reservation id and an indication of required channel capacity.

32. The system of claim 31, wherein the channel level reservation id includes a source id and a unique id from source.

33. The system of claim 31, wherein the indication of required channel capacity includes B/I, representing the number of bits (B) to send in an interval (I).

34. The system of claim 31, wherein the indication of required channel capacity includes using a linear bounded arrival process.

35. The system of claim 29, wherein the first clear to send signal contains a channel reservation id.

36. The system of claim 29, wherein the modified request to send signal includes a channel reservation id.

37. The system of claim 29, wherein the receiving component occurs using a bandwidth confirmed by the first clear to send signal.

38. A computer usable medium having computer readable code embodied therein for reserving access to a transmission bandwidth in a communications channel at a server in a network, the computer usable medium comprising:
- a reservation receiving module configured to receive from a terminal a reservation request to send signal, representing a request for reservation of transmission bandwidth in a communications channel in the network;
- a first transmitting module configured to transmit a first clear to send signal to the terminal;
- an admission receiving module configured to receive from the terminal a modified request to send signal, representing a request for admission to transmit data over reserved bandwidth of a communications channel in the network;
- a second transmitting module configured to transmit a second clear to send signal; and
- a receiving module configured to receive a data packet from the terminal.

39. A method of reserving access to a transmission bandwidth in a communications channel in a network, comprising the steps of:
- transmitting from a terminal to a server a reservation request to send signal, indicating a request for reservation of transmission bandwidth in a communications channel in the network;
- receiving at the server the reservation request to send signal, representing the request for reservation of transmission bandwidth in a communications channel in the network;
- transmitting a first clear to send signal from the server to the terminal;
- receiving the first clear to send signal at the terminal;
- transmitting from the terminal to the server a modified request to send signal, indicating a request for admission to transmit data over reserved bandwidth of a communications channel in the network;
- receiving at the server the modified request to send signal, representing the request for admission to transmit data over reserved bandwidth of a communications channel in the network;
- transmitting a second clear to send signal from the server to the terminal;
- receiving the second clear to send signal at the terminal;
- transmitting a data packet from the terminal to the server, and
- receiving the data packet at the server.

40. The method of claim 39, further comprising:
- transmitting an acknowledgment signal to the terminal following the receipt of the data packet at the server; and
- receiving the acknowledgment signal from the server at the terminal following the transmission of the data packet.

41. The method of claim 39, wherein the reservation request to send signal includes a channel level reservation id and an indication of required channel capacity.

42. The method of claim 41, wherein the channel level reservation id includes a source id and a unique id from source.

43. The method of claim 41, wherein the indication of required channel capacity includes B/I, representing the number of bits (B) to send in an interval (I).

44. The method of claim 41, wherein the indication of required channel capacity includes using a linear bounded arrival process.

45. The method of claim 39, wherein the first clear to send signal contains a channel reservation id.

46. The method of claim 39, wherein the modified request to send signal includes a channel reservation id.

47. The method of claim 39, wherein the fifth transmitting and receiving steps occur by using a bandwidth confirmed by the first clear to send signal.

48. A system for reserving access to a transmission bandwidth in a communications channel in a network, comprising:
- a reservation transmitting component configured to transmit from a terminal to a server a reservation request to send signal, indicating a request for reservation of transmission bandwidth in a communications channel in the network;
- a reservation receiving component configured to receive at the server the reservation request to send signal, representing the request for reservation of transmission bandwidth in a communications channel in the network;

a first transmitting component configured to transmit a first clear to send signal from the server to the terminal;

a first receiving component configured to receive the first clear to send signal at the terminal;

an admission transmitting component configured to transmit from the terminal to the server a modified request to send signal, indicating a request for admission to transmit data over reserved bandwidth of a communications channel in the network;

an admission receiving component configured to receive at the server the modified request to send signal, representing the request for admission to transmit data over reserved bandwidth of a communications channel in the network;

a second transmitting component configured to transmit a second clear to send signal from the server to the terminal;

a second receiving component configured to receive the second clear to send signal at the terminal;

a transmitting component configured to transmit a data packet from the terminal to the server, and a receiving component configured to receive the data packet at the server.

49. The system of claim 48, further comprising:

an acknowledgment transmitting an acknowledgment signal to the terminal following the receipt of the data packet at the server; and an acknowledgment receiving the acknowledgment signal from the server at the terminal following the transmission of the data packet.

50. The system of claim 48, wherein the reservation request to send signal includes a channel level reservation id and an indication of required channel capacity.

51. The system of claim 50, wherein the channel level reservation id includes a source id and a unique id from source.

52. The system of claim 50, wherein the indication of required channel capacity includes B/I, representing the number of bits (B) to send in an interval (I).

53. The system of claim 50, wherein the indication of required channel capacity includes using a linear bounded arrival process.

54. The method of claim 48, wherein the first clear to send signal contains a channel reservation id.

55. The method of claim 48, wherein the modified request to send signal includes a channel reservation id.

56. The method of claim 48, wherein the transmitting and receiving steps occur by using a bandwidth confirmed by the first clear to send signal.

57. A computer usable medium having computer readable code embodied therein for reserving access to a transmission bandwidth in a communications channel in a network, the computer usable medium comprising:

a reservation transmitting module configured to transmit from a terminal to a server a reservation request to send signal, indicating a request for reservation of transmission bandwidth in a communications channel in the network;

a reservation receiving module configured to receive at the server the reservation request to send signal, representing the request for reservation of transmission bandwidth in a communications channel in the network;

a first transmitting module configured to transmit a first clear to send signal from the server to the terminal;

a first receiving module configured to receive the first clear to send signal at the terminal;

an admission transmitting module configured to transmit from the terminal to the server a modified request to send signal, indicating a request for admission to transmit data over reserved bandwidth of a communications channel in the network;

an admission receiving module configured to receive at the server the modified request to send signal, representing the request for admission to transmit data over reserved bandwidth of a communications channel in the network;

a second transmitting module configured to transmit a second clear to send signal from the server to the terminal;

a second receiving module configured to receive the second clear to send signal at the terminal;

a transmitting module configured to transmit a data packet from the terminal to the server, and a receiving module configured to receive the data packet at the server.

58. A method of processing a reservation request to a transmission bandwidth in a communications channel at a terminal in a network, comprising the steps of:

initializing a reservation request to send signal in an initialization state, the reservation request to send signal containing reservation identification information;

transmitting the reservation request to send signal to a server;

waiting for the server to respond to the reservation request to send signal in a reservation pending state;

receiving a clear to send signal from the server;

authorizing a data packet for transmission to the server in a reserve flow state; and transmitting the data packet to the server in a packet pending state.

59. The method of claim 58, further comprising:

reinitializing the initialization state in the reservation pending state in event of a timeout.

60. The method of claim 58, further comprising:

reinitializing in the reserve flow state in event of a timeout.

61. The method of claim 58, further comprising:

receiving a second clear to send signal from the server; and authorizing a second data packet for transmission to the server in the reserved flow state.

62. A system for processing a reservation request to a transmission bandwidth in a communications channel at a terminal in a network, comprising the steps of:

an initializing component configured to initialize a reservation request to send signal in an initialization state, the reservation request to send signal containing reservation identification information;

a reservation transmitting component configured to transmit the reservation request to send signal to a server;

a waiting component configured to wait for the server to respond to the reservation request to send signal in a reservation pending state;

a receiving component configured to receive a clear to send signal from the server;

an authorizing component configured to authorize a data packet for transmission to the server in a reserve flow state; and a transmitting component configured to transmit the data packet to the server in a packet pending state.

63. The system of claim 62, further comprising:
a reinitializing component configured to reinitialize the initialization state in the reservation pending state in event of a timeout.

64. The system of claim 62, further comprising:
a reinitializing component configured to reinitialize in the reserve flow state in event of a timeout.

65. The system of claim 62, further comprising:
a second receiving component configured to receive a second clear to send signal from the server; and
a second authorizing component configured to authorize a second data packet for transmission to the server in the reserved flow state.

66. A computer usable medium having computer readable code embodied therein for processing a reservation request to a transmission bandwidth in a communications channel at a terminal in a network, the computer usable medium comprising:
an initializing module configured to initiate a reservation request to send signal in an initialization state, the reservation request to send signal containing reservation identification information;
a reservation transmitting module configured to transmit the reservation request to send signal to a server;
a waiting module configured to wait for the server to respond to the reservation request to send signal in a reservation pending state;
a receiving module configured to receive a clear to send signal from the server;
an authorizing module configured to authorize a data packet for transmission to the server in a reserve flow state; and
a transmitting module configured to transmit the data packet to the server in a packet pending state.

67. A method of processing a reservation request to a transmission bandwidth in a communications channel at a server in a network, comprising the steps of:
initializing a reservation request to send signal processor at the server in an initialization state, the reservation request to send signal containing reservation identification information;
receiving a reservation request to send signal from a terminal;
processing the reservation request to send signal at the server, resulting in a reservation request success or reservation request failure in a reserve flow state;
transmitting a clear to send signal to the terminal, when reservation request success in the reserve flow state; and
receiving a data packet at the server.

68. The method of claim 67, further comprising:
reinitializing the initialization state in the reserve flow state, when reservation request failure in the reserve flow state.

69. The method of claim 67, further comprising:
reinitializing the initialization state in the reserve flow state in the event of a timeout.

70. A system for processing a reservation request to a transmission bandwidth in a communications channel at a server in a network, comprising:
an initializing component configured to initialize a reservation request to send signal processor at the server in an initialization state, the reservation request to send signal containing reservation identification information;
a reservation receiving component configured to receive receiving a reservation request to send signal from a terminal;
a processing component configured to process the reservation request to send signal at the server, resulting in a reservation request success or reservation request failure in a reserve flow state;
a transmitting component configured to transmit a clear to send signal to the terminal, when reservation request success in the reserve flow state; and
a receiving component configured to receive a data packet at the server.

71. The system of claim 70, further comprising:
a reinitializing component configured to reinitialize the initialization state in the reserve flow state, when reservation request failure in the reserve flow state.

72. The system of claim 70, further comprising:
a reinitializing component configured to reinitialize the initialization state in the reserve flow state in the event of a timeout.

73. A computer usable medium having computer readable code embodied therein for processing a reservation request to a transmission bandwidth in a communications channel at a server in a network, the computer usable medium comprising:
an initializing module configured to initialize a reservation request to send signal processor at the server in an initialization state, the reservation request to send signal containing reservation identification information;
a reservation receiving module configured to receive a reservation request to send signal from a terminal;
a processing module configured to process the reservation request to send signal at the server, resulting in a reservation request success or reservation request failure in a reserve flow state;
a transmitting module configured to transmit a clear to send signal to the terminal, when reservation request success in the reserve flow state; and
a receiving module configured to receive a data packet at the server.

74. A method of processing admission to a server in a network for a reservation request to a transmission bandwidth in a communications channel, comprising the steps of:
initializing the server to receive a modified request to send signal in a wait state, the modified request to send signal containing reservation identification information;
authorizing use of bandwidth in a communications channel in response to the modified request to send signal in an admission pending state, when capacity permits; and
rejecting use of bandwidth in a communications channel in response to the modified request to send signal in the admission pending state, when capacity does not permit.

75. The method of claim 74, further comprising:
reinitializing the wait state in the event of an admission success.

76. The method of claim 74, further comprising:
reinitializing the wait state in the event of an admission failure.

77. A system for processing admission to a server in a network for a reservation request to a transmission bandwidth in a communications channel, comprising:

an initializing component configured to initialize the server to receive a modified request to send signal in a wait state, the modified request to send signal containing reservation identification information;

an authorizing component configured to authorize use of bandwidth in a communications channel in response to the modified request to send signal in an admission pending state, when capacity permits; and a rejecting component configured to reject use of bandwidth in a communications channel in response to the modified request to send signal in the admission pending state, when capacity does not permit.

78. The system of claim 77, further comprising:

a reinitializing component configured to reinitialize the wait state in the event of an admission success.

79. The system of claim 77, further comprising:

a reinitializing component configured to reinitialize the wait state in the event of an admission failure.

80. A computer usable medium having computer readable code embodied therein for processing admission to a server in a network for a reservation request to a transmission bandwidth in a communications channel, the computer usable medium comprising:

an initializing module configured to initiate the server to receive a modified request to send signal in a wait state, the modified request to send signal containing reservation identification information;

an authorizing module configured to authorize use of bandwidth in a communications channel in response to the modified request to send signal in an admission pending state, when capacity permits; and a rejecting module configured to reject use of bandwidth in a communications channel in response to the modified request to send signal in the admission pending state, when capacity does not permit.

81. A method of accessing a network to obtain a reservation of access to a transmission bandwidth in a communications channel, comprising the steps of:

receiving a request to send signal;

recognizing a reservation type from the request to send signal;

transmitting a reservation request to send signal to a server, when the reservation type is a packet;

generating a unique id and recognizing a channel capacity, when the reservation type is a reservation; and transmitting a reservation request to send signal to a server, which contains the unique id and the channel capacity, when the reservation type is a reservation.

82. The method of claim 81, further comprising:

transmitting a modified request to send signal to a server, which contains a channel reservation id, when the reservation type is an admission.

83. A system for accessing a network to obtain a reservation of access to a transmission bandwidth in a communications channel, comprising:

a receiving component configured to receive a request to send signal;

a recognizing component configured to recognize a reservation type from the request to send signal;

a packet transmitting component configured to transmit a reservation request to send signal to a server, when the reservation type is a packet;

a generating component configured to generate a unique id and recognizing a channel capacity, when the reservation type is a reservation; and a reservation transmitting component configured to transmit a reservation request to send signal to a server, which contains the unique id and the channel capacity, when the reservation type is a reservation.

84. The method of claim 83, further comprising:

an admission transmitting component configured to transmit a modified request to send signal to a server, which contains a channel reservation id, when the reservation type is an admission.

85. A computer usable medium having computer readable code embodied therein for accessing a network to obtain a reservation of access to a transmission bandwidth in a communications channel, the computer usable medium comprising:

a receiving module configured to receive a request to send signal;

a recognizing module configured to recognize a reservation type from the request to send signal;

a packet transmitting module configured to transmit a reservation request to send signal to a server, when the reservation type is a packet;

a generating module configured to generate a unique id and recognizing a channel capacity, when the reservation type is a reservation; and a reservation transmitting module configured to transmit a reservation request to send signal to a server, which contains the unique id and the channel capacity, when the reservation type is a reservation.

86. A method of processing a reservation request for access to a transmission bandwidth in a communications channel in a network, comprising the steps of:

receiving a reservation request to send signal in an initialization state;

recognizing a channel capacity from the reservation request;

comparing the channel capacity to a used capacity, the used capacity being based on active reservations;

determining whether the channel capacity and the used capacity exceed a total capacity;

rejecting the reservation request, when the channel capacity exceeds the total capacity; and approving the reservation request, when the channel capacity does not exceed the total capacity.

87. The method of claim 86, further comprising:

reinitializing the initialization state in the event of a time out.

88. A system for processing a reservation request for access to a transmission bandwidth in a communications channel in a network, comprising:

a receiving component configured to receive a reservation request to send signal in an initialization state;

a recognizing component configured to recognize a channel capacity from the reservation request;

a comparing component configured to compare the channel capacity to a used capacity, the used capacity being based on active reservations;

a determining component configured to determine whether the channel capacity and the used capacity exceed a total capacity;

a rejecting component configured to reject the reservation request, when the channel capacity exceeds the total capacity; and an approving component configured to approve the reservation request, when the channel capacity does not exceed the total capacity.

89. The system of claim 88, further comprising:
a reinitializing component configured to reinitialize the initialization state in the event of a time out.

90. A computer usable medium having computer readable code embodied therein for processing a reservation request for access to a transmission bandwidth in a communications channel in a network, the computer usable medium comprising:
a receiving module configured to receive a reservation request to send signal in an initialization state;
a recognizing module configured to recognize a channel capacity from the reservation request;
a comparing module configured to compare the channel capacity to a used capacity, the used capacity being based active reservations;
a determining module configured to determine whether the channel capacity and the used capacity exceed a total capacity;
a rejecting module configured to reject the reservation request, when the channel capacity exceeds the total capacity; and
an approving module configured to approve the reservation request, when the channel capacity does not exceed the total capacity.

91. A method of processing an admission request for access to a transmission bandwidth in a communications channel in a network, comprising the steps of:
receiving a modified request to send signal from a terminal, the modified request to send signal containing reservation identification information;
recognizing a channel capacity scheme, providing for a computation scheme for an available communications capacity of the network;
computing an available capacity, representing the available communications capacity of the network;
admitting the modified request to send signal, when the modified request to send signal requests a capacity less than or equal to the available capacity; and
rejecting the modified request to send signal, when the modified request to send signal requests a capacity more than the available capacity.

92. The method of claim 91, wherein the admitting step includes transmitting a clear to send signal to the terminal.

93. The method of claim 91, wherein the channel capacity scheme utilizes a moving window descriptor.

94. The method of claim 91, wherein the channel capacity scheme utilizes a leaky bucket descriptor.

95. A system for processing an admission request for access to a transmission bandwidth in a communications channel in a network, comprising:
a receiving component configured to receive a modified request to send signal from a terminal, the modified request to send signal containing reservation identification information;
a recognizing component configured to recognize a channel capacity scheme, providing for a computation scheme for an available communications capacity of the network;
a computing component configured to compute an available capacity, representing the available communications capacity of the network;
an admitting component configured to admit the modified request to send signal, when the modified request to send signal, when the modified request to send signal requests a capacity less than or equal to the available capacity; and
a rejecting component configured to reject the modified request to send signal, when the modified request to send signal requests a capacity more than the available capacity.

96. The system of claim 95, wherein the admitting component includes a transmitting component configured to transmit a clear to send signal to the terminal.

97. The system of claim 95, wherein the channel capacity scheme utilizes a moving window descriptor.

98. The system of claim 95, wherein the channel capacity scheme utilizes the leaky bucket descriptor.

99. A computer usable medium having computer readable code embodied therein for processing an admission request for access to a transmission bandwidth in a communications channel in a network, the computer usable medium comprising:
a receiving module configured to receive a modified request to send signal from a terminal, the modified request to send signal containing reservation identification information;
a recognizing module configured to recognize a channel capacity scheme, providing for a computation scheme for an available communications capacity of the network;
a computing module configured to compute an available capacity, representing the available communications capacity of the network;
an admitting module configured to admit the modified request to send signal, when the modified request to send signal requests a capacity less than or equal to the available capacity; and
a rejecting module configured to reject the modified request to send signal, when the modified request to send signal requests a capacity more than the available capacity.

100. A method of reserving channel access in a network, comprising the steps of:
transmitting from a client to a server a request for reservation of access to a communications channel in the network for transmission of information using a particular bandwidth, the request for reservation of access containing reservation identification information;
determining if sufficient bandwidth in the channel exists to provide the requested transmission; and
transmitting from the server to the client an indication of acceptance of the reservation, when sufficient bandwidth exists.

101. A system for reserving channel access in a network, comprising:
a reservation transmitting component configured to transmit from a client to a server a request for reservation of access to a communications channel in the network for transmission of information using a particular bandwidth, the request for reservation of access containing reservation identification information;
a determining component configured to determine if sufficient bandwidth in the channel exists to provide the requested transmission; and
an acceptance transmitting component configured to transmit from the server to the client an indication of acceptance of the reservation, when sufficient bandwidth exists.

102. A computer usable medium having computer readable code embodied therein for reserving channel access in a network, the computer usable medium comprising:

a reservation transmitting module configured to transmit from a client to a server a request for reservation of access to a communications channel in the network for transmission of information using a particular bandwidth, the request for reservation of access containing reservation identification information;

a determining module configured to determine if sufficient bandwidth in the channel exists to provide the requested transmission; and an acceptance transmitting module configured to transmit from the server to the client an indication of acceptance of the reservation, when sufficient bandwidth exists.

103. A method of establishing a transmission protocol in communications network, comprising the steps of:

transmitting from a client to a server a signal requesting access to a communications channel in the network for transmission of information using a particular bandwidth;

determining, based upon reservations issued for the channel and available bandwidth for the channel, if sufficient bandwidth in the channel exists to provide the requested transmission; and transmitting from the server to the client an indication of acceptance of the reservation, when sufficient bandwidth exists.

104. A system for establishing a transmission protocol in communications network, comprising:

a reservation transmitting component configured to transmit from a client to a server a signal requesting access to a communications channel in the network for transmission of information using a particular bandwidth;

p1 a determining component configured to determine, based upon reservations issued for the channel and available bandwidth for the channel, if sufficient bandwidth in the channel exists to provide the requested transmission; and an acceptance transmitting component configured to transmit from the server to the client an indication of acceptance of the reservation, when sufficient bandwidth exists.

105. A computer usable medium having computer readable code embodied therein for establishing a transmission protocol in communications network, the computer usable medium comprising:

a reservation transmitting module configured to transmit from a client to a server a signal requesting access to a communications channel in the network for transmission of information using a particular bandwidth;

a determining module configured to determine, based upon reservations issued for the channel and available bandwidth for the channel, if sufficient bandwidth in the channel exists to provide the requested transmission; and an acceptance transmitting module configured to transmit from the server to the client an indication of acceptance of the reservation, when sufficient bandwidth exists.

106. A control message stored in a computer-readable medium for use in establishing transmission protocol in a communications network, comprising:

a computer-readable medium storing a reservation signal requesting a reservation for access to a channel in the communications network for transmitting information using a particular bandwidth, the reservation signal requesting a reservation containing reservation identification information, the reservation signal used by a server for allocating bandwidth in the communications channel and transmitting signals providing access to the channel for transmission of information using particular bandwidths.

* * * * *